(12) United States Patent
Almblad

(10) Patent No.: US 11,154,161 B2
(45) Date of Patent: Oct. 26, 2021

(54) AUTOMATED FOOD COOKING SYSTEM

(71) Applicant: Robert Almblad, Lynchburg, VA (US)

(72) Inventor: Robert Almblad, Lynchburg, VA (US)

( * ) Notice: Subject to any disclaimer, the term of this patent is extended or adjusted under 35 U.S.C. 154(b) by 377 days.

(21) Appl. No.: 16/210,022

(22) Filed: Dec. 5, 2018

(65) Prior Publication Data
US 2019/0208957 A1    Jul. 11, 2019

Related U.S. Application Data

(60) Provisional application No. 62/594,882, filed on Dec. 5, 2017.

(51) Int. Cl.
| A47J 37/04 | (2006.01) |
| A47J 37/06 | (2006.01) |
| A47J 37/07 | (2006.01) |
| A47J 44/00 | (2006.01) |
| A47J 36/32 | (2006.01) |

(52) U.S. Cl.
CPC .......... *A47J 37/0611* (2013.01); *A47J 36/32* (2013.01); *A47J 37/044* (2013.01); *A47J 37/045* (2013.01); *A47J 37/0745* (2013.01); *A47J 37/0786* (2013.01); *A47J 44/00* (2013.01)

(58) Field of Classification Search
CPC ............ A47J 37/0611; A47J 2037/0617; A47J 37/044; A47J 37/045
USPC ............... 99/373, 386, 389, 391, 443 C, 423
See application file for complete search history.

(56) References Cited

U.S. PATENT DOCUMENTS

| 3,425,341 | A | * | 2/1969 | McGinley | ................ | A21B 1/02 |
| | | | | | | 99/423 |
| 4,185,546 | A | * | 1/1980 | Karpisek | ............. | A47J 37/0857 |
| | | | | | | 99/386 |
| 4,444,094 | A | * | 4/1984 | Baker | .................. | A47J 37/044 |
| | | | | | | 99/327 |
| 4,567,819 | A | | 2/1986 | Adamson | | |
| 5,006,358 | A | * | 4/1991 | Ribio | ..................... | A21C 11/00 |
| | | | | | | 426/496 |
| 5,931,083 | A | * | 8/1999 | Stanger | ................... | A47J 27/04 |
| | | | | | | 99/349 |
| 6,244,019 | B1 | | 6/2001 | Ljungqvist et al. | | |
| 6,245,297 | B1 | * | 6/2001 | Kowallis | .............. | B01L 3/0244 |
| | | | | | | 422/562 |
| 6,370,886 | B1 | * | 4/2002 | Ochs | ....................... | A23G 9/14 |
| | | | | | | 62/63 |

(Continued)

FOREIGN PATENT DOCUMENTS

| WO | WO2006125058 | 11/2006 |
| WO | WO2013117530 | 8/2013 |

OTHER PUBLICATIONS

International Search Report for PCT/US2018/063955 dated Mar. 27, 2019.

*Primary Examiner* — Reginald Alexander
(74) *Attorney, Agent, or Firm* — Michael J. Nickerson; Basch & Nickerson LLP

(57) ABSTRACT

An automated grill system includes a food product dispensing system for dispensing uncooked food product; a dual-sided grill system for cooking the uncooked food product; a staging system for receiving cooked food product; and a non-continuous indexed conveyor belt for conveying the uncooked food product from the food product dispensing system to the dual-sided grill system and for conveying the cooked food product from the dual-sided grill system to the staging system.

16 Claims, 14 Drawing Sheets

(56) References Cited

U.S. PATENT DOCUMENTS

| | | |
|---|---|---|
| 8,359,970 B2 | 1/2013 | Calzada et al. |
| 8,367,977 B2 | 2/2013 | Lehman et al. |
| 8,822,886 B2 | 9/2014 | Lehman et al. |
| 9,301,646 B2 | 4/2016 | Rosa et al. |
| 9,861,229 B2 | 1/2018 | Lehman |
| 9,867,501 B2 | 1/2018 | Lehman |
| 2006/0261082 A1 | 11/2006 | Almblad et al. |
| 2006/0283153 A1 | 12/2006 | Nakano |
| 2012/0151882 A1 | 6/2012 | Nakano |
| 2014/0037828 A1* | 2/2014 | Kot ................... A23L 19/13 426/637 |
| 2019/0059643 A1* | 2/2019 | Minard ............... A47J 37/044 |
| 2019/0104883 A1* | 4/2019 | Nelson ................ A47J 44/00 |

* cited by examiner

AUTOMATED FOOD COOKING SYSTEM

PRIORITY INFORMATION

The present application claims priority, under 35 U.S.C. § 119(e), from U.S. Provisional Patent Application, Ser. No. 62/594,882, filed on Dec. 5, 2017. The entire content of U.S. Provisional Patent Application, Ser. No. 62/594,882, filed on Dec. 5, 2017, is hereby incorporated by reference.

BACKGROUND

Various types of cooking devices are known in the art. Specifically, various types of grills are known. In one type of grill, the food is placed on a grilling surface, grilling the side of the food that contacts the grilling surface. After that side of the food is cooked, the food is manually turned or flipped to cook the opposite side. After the second side of the food is cooked, the food is removed from the grill for further preparation and/or serving.

In another type of grill, two-sided cooking is accomplished simultaneously. Such grills are commonly known as clamshell grills and have upper and lower cooking platens that are horizontally opposed for contacting the two sides of a food item simultaneously to thereby cook both sides simultaneously.

For proper performance, the two grilling surfaces should be parallel to each other so that each surface uniformly contacts and cooks the associated side of the food item that contacts a respective platen cooking surface.

There is a large amount of activity in the general field of restaurant automation in context of hygienic handling of various food product(s), and several studies and researches as well as invention(s) have delved upon the subject(s) of 'packaging' and 'unpackaging' procedures/methods. Protocols such as lamination, sheet-layering, foil packaging and peeling off, dismantling and delamination, at the manufacture sites (food processing factories/units) and usage sites (restaurants, hotels and eating points) are known to be in existence in the prior art profile.

The prior art discloses patents on delamination of a laminate, use of conveyor belts to transport laminated food products from one place to other, as well as use of several methods for unpacking the laminated food products such as peeling of film, delamination of laminated food and also in some cases the deployment of stripper unit. However, the prior art profile does not eliminate the need of human interference such as the food product directly passed on to a cooking unit.

U.S. Pat. No. 5,141,584 discloses an apparatus and method for delaminating a composite sheet structure of the kind comprising a vertically frangible layer having a first surface adhesively bonded to a first sheet at a substantially uniform strength and an opposite surface abutting areas which are, respectively, adhesively bonded to a second sheet at strengths less or greater than the uniform strength and having a marginal portion or tab extending beyond the first sheet. The composite sheet structure is fed into the nip of upper and lower peel rollers and upon passage therethrough a strip sheet roller is rotated into position to bend and hold the laminate against the upper peel roller in a position to fracture the tab from the first sheet. On reversal of the feed direction and passage of the laminate back through the nip of the strip sheet and upper peel rollers, the thicker "keeper sheet" of the flexed laminate breaks from the "throw-away" sheet containing the tab at the preformed tab. A roller configuration and drive train structure are provided that provides a more predictable and repeatable steady state condition and allows for control of the location of the peel point to be accomplished.

Another conventional system is a method and device for packaging or unpackaging portions of a deep frozen food product. The invention provides details about how the process packs portions of—a low temperature foodstuff are first arranged with longitudinal separations in a row behind one another. The portions are guided between two strips of foil packaging which are then combined in order to form a ribbon. The portions may be placed in chambers in one of the strips, which are arranged along it with equal spacings. Each strip may also have half-chambers, and may be guided together in order to align corresponding half-chambers with each other prior to the introduction of a portion into one or both of them.

U.S. Pat. No. 6,244,019 discloses a system for packaging and unpackaging can lids. The system relates to packages for stacked can lids, a method of producing such packages, devices for implementing said method, devices for automated unpacking of the above nature and a system for packing and unpacking can lids. The packages are formed with an open end, which is closed in that the bag end, when in unfolded condition, is compressed and is provided with fastening means retaining said closed condition.

In addition, the closing device closes the open package end by compressing the bag end in the unfolding condition and in that fastening means are applied retaining said dosed condition, and the unpacking device causes relative movement of the packages and the can lids contained therein in such a manner that the can lids are pressed against the package end closed by means of said fastening means.

The features of the afore-mentioned prior art disclose complex design and bulky structural indices thereby hindering utilization in restaurant automation devices. Moreover, none addresses the use of restaurant automation in highly aseptic conditions by eliminating human interference during transfer of food products from refrigerated storage to cooking unit.

Therefore, it is desirable to provide a system that enables the automation of a meat cooking apparatus which minimizes human interaction and provides an efficient and consistent cooking process.

BRIEF DESCRIPTION OF THE DRAWING

The drawings are only for purposes of illustrating various embodiments and are not to be construed as limiting, wherein.

DETAILED DESCRIPTION OF THE DRAWINGS

Figure 1:
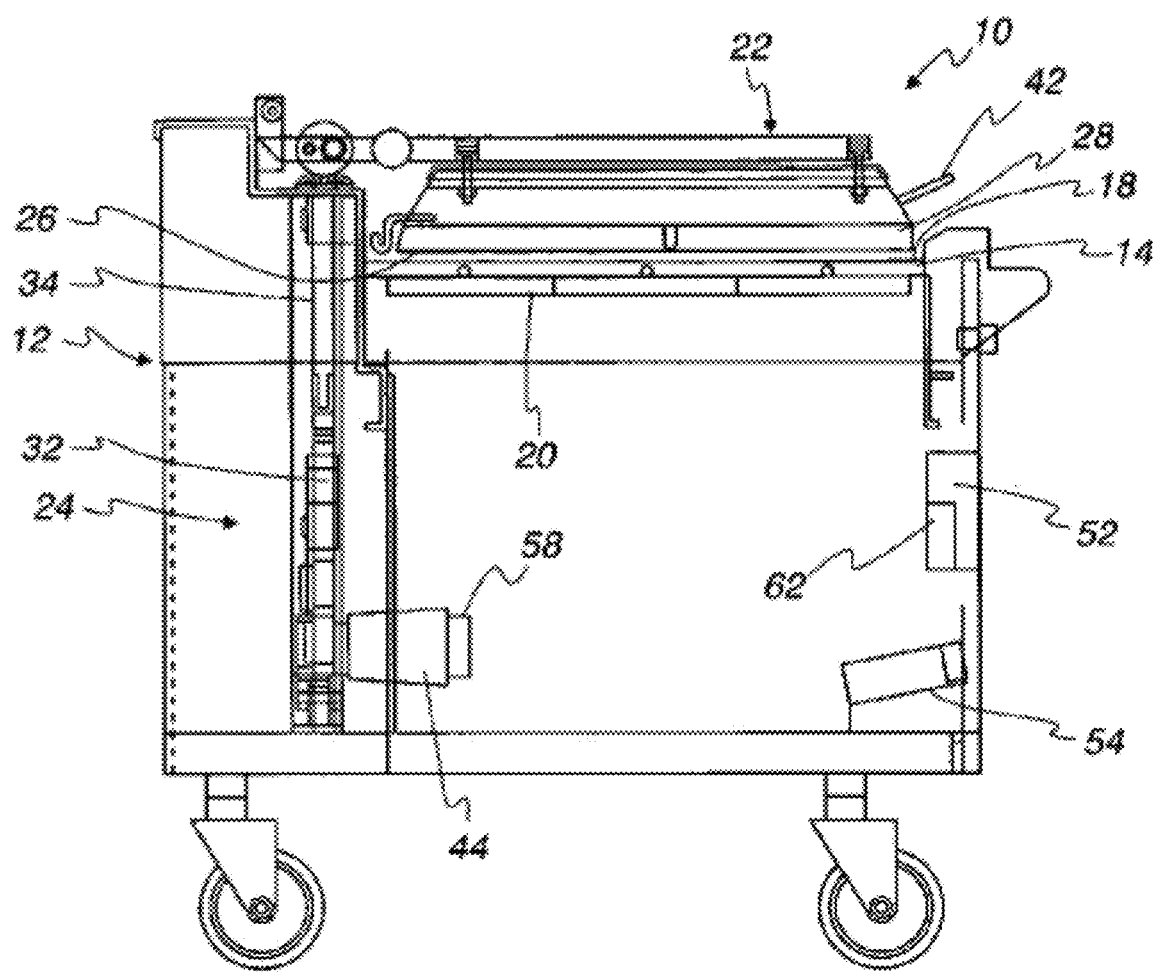
FIG. 1 is a side view of a clamshell grill.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 illustrates an example of a system of cooking food with a dual-surface grill. The grill is of the type that has upper and lower cooking platens. The system automatically determines prior to the start of a cooking cycle whether an upper cooking platen and a lower cooking platen are substantially parallel to each other when in a cooking position. If the upper platen and the lower platen are substantially parallel to each other, the food is contacted with the upper and lower platens to cook the food. If the upper and lower platens are not substantially parallel to each other, at least one of the upper and lower platens is adjusted so that the upper and lower platens are at least substantially parallel to each other when in a cooking position.

After the adjustment, if necessary, the food is contacted with the upper and lower platens to thereby cook the food.

As illustrated in FIG. 1, a clamshell grill 10 provides the cooking function. The clamshell grill 10 includes a support structure 12 to which a lower cooking platen 14 is horizontally mounted. Lower platen 14 has a generally smooth, flat cooking surface 18 on its upper side. Lower platen 14 is heated to cooking temperature by one or more heating units 20, which may be gas or electric.

An upper platen assembly 22 is movably mounted to the rear of support structure 12 by means of an upper platen positioning mechanism 24. Upper platen assembly 22 comprises an upper cooking platen 28 heated to cooking temperature by heating elements mounted within a casing. Upper cooking platen 28 may be of an equivalent size to lower cooking platen 14. The upper platen 28 has a flat cooking surface 26 and may be independently heated.

It is noted that by mounting independent upper platen assemblies over a single lower platen, independent cooking zones between upper platen cooking surfaces and lower platen cooking surface may be created to allow greater flexibility for the cook/operator. For example, one upper platen assembly may be used to cook one food product, while other food products can be simultaneously cooked with respect to adjacent upper platen assemblies.

In another example, one batch of food product, for example hamburger patties, may be in the middle of a cooking cycle with respect to a first upper platen assembly. If additional food product needs to be cooked, the cooking of additional food product may be initiated at the other upper platen assemblies, while the patties continue to cook at the first upper platen assembly.

Figure 2:
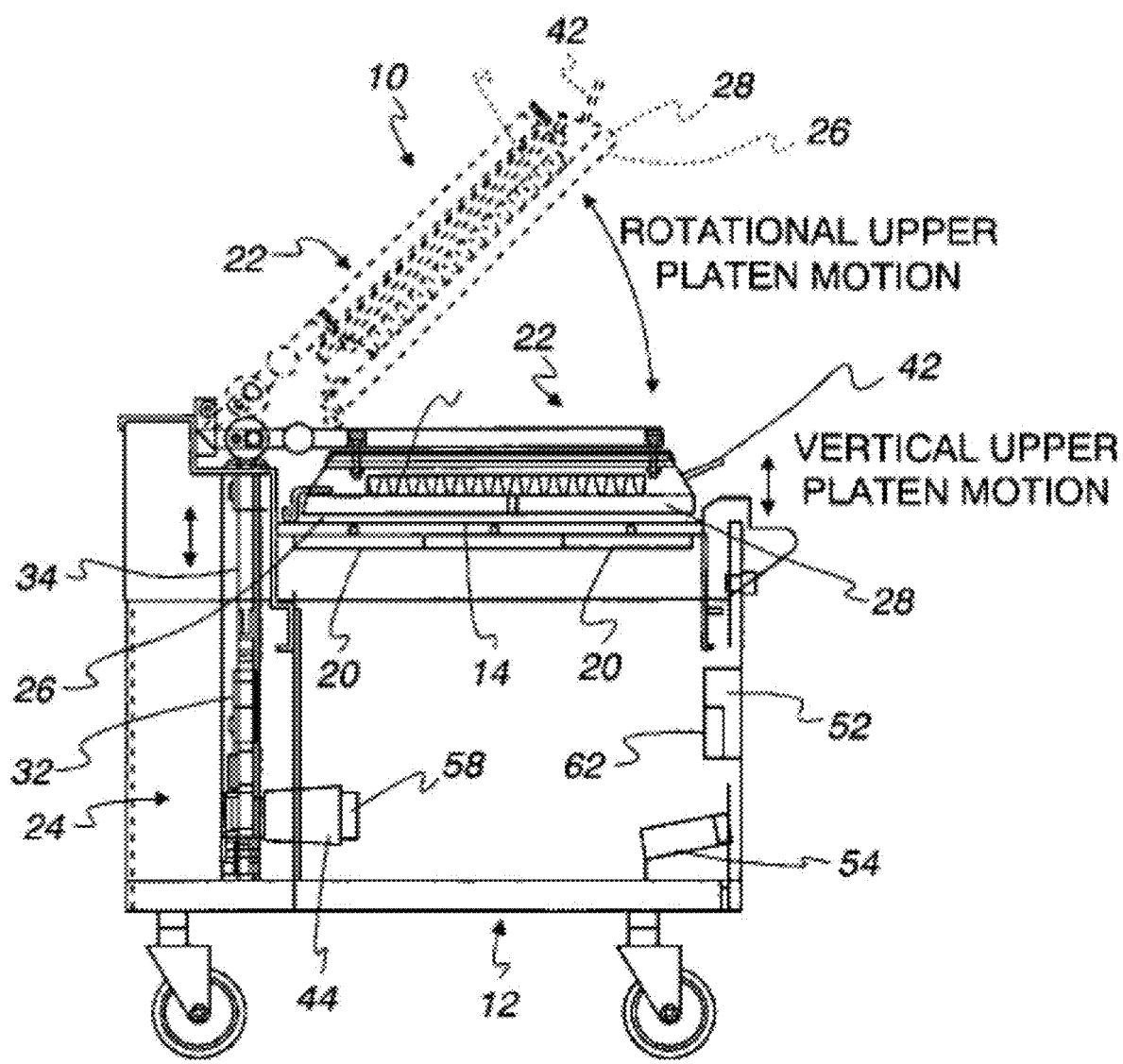
FIG. 2 is a side view of the grill of FIG. 1 illustrating movement of the upper platen between a fully open position and the cooking orientation.

As illustrated in FIG. 2, positioning mechanism 24 may be used to facilitate two distinct motions by upper platen assembly 22 from its uppermost position to a cooking position. One motion is a rotational motion to rotate upper platen assembly 22 from an upward open position to a downward horizontal cooking position parallel to lower platen 14. The other motion is a linear vertical motion to space a horizontally oriented upper platen assembly 22 relative to the lower platen 14.

To provide the vertical movement to change the height of upper platen assembly 22 relative to cooking surface 18, a linear actuator 32 is linked to two vertical reciprocating shafts 34 by an actuator cross bar linkage. Actuator cross bar linkage is clamped to vertical reciprocating shafts 34, which run through linear motion bearings. The rotational movement of upper platen assembly 22 may be manually accomplished by means of a handle 42.

A linear actuator assembly comprises a drive motor 44, linear actuator 32, two substantially vertical reciprocating shafts 34, and position sensor switches. Linear actuator 32, when activated, moves upper platen assembly 22 and upper platen 28 vertically. The rotation providing mechanism rotates upper platen assembly 22 upwards from a horizontal orientation to an open position, as shown in FIG. 2, as linear actuator 32 completes its upward stroke. Likewise, as linear actuator 32 begins its downward stroke, the rotation providing mechanism rotates the upper platen assembly 22 back to a horizontal, or closed, orientation.

Grill 10 includes a user interface 52. Interface 52 includes an activation button to start a cooking cycle when it is depressed to start a cooking cycle. At that time, user interface 52 sends information to a microprocessor 62 that is in data communication with a motor position controller 54. This information is used by motor position controller 54 to activate linear drive motor 44.

In a typical cooking cycle, the grill apparatus begins in an inactive state, with its upper platen assembly in its fully opened and raised position. The upper platen assembly is at an angle from horizontal. The operator will select the relevant product setting, from the menu on a control panel, and then will load the food product, a single layer thick, across the surface area of lower platen. When loading is complete, the operator will depress an activation button to initiate the cook cycle.

An example of a dual sided cooking grill is disclosed in U.S. Pat. No. 8,359,970. The entire content of U.S. Pat. No. 8,359,970 is hereby incorporated by reference.

Another example of a dual sided cooking grill is disclosed in U.S. Pat. No. 9,301,646. The entire content of U.S. Pat. No. 9,301,646 is hereby incorporated by reference.

To fully automate a grill cooking system, a system of automatically providing a food product to the grill system and a system of automatically removing the cooked product from the grill system and moving it to a preparation or staging area would be desired.

To facilitate automatically providing a food product to the grill system, FIGS. 3 through 11 provide illustrations of a food dispensing assembly.

Figure 3:
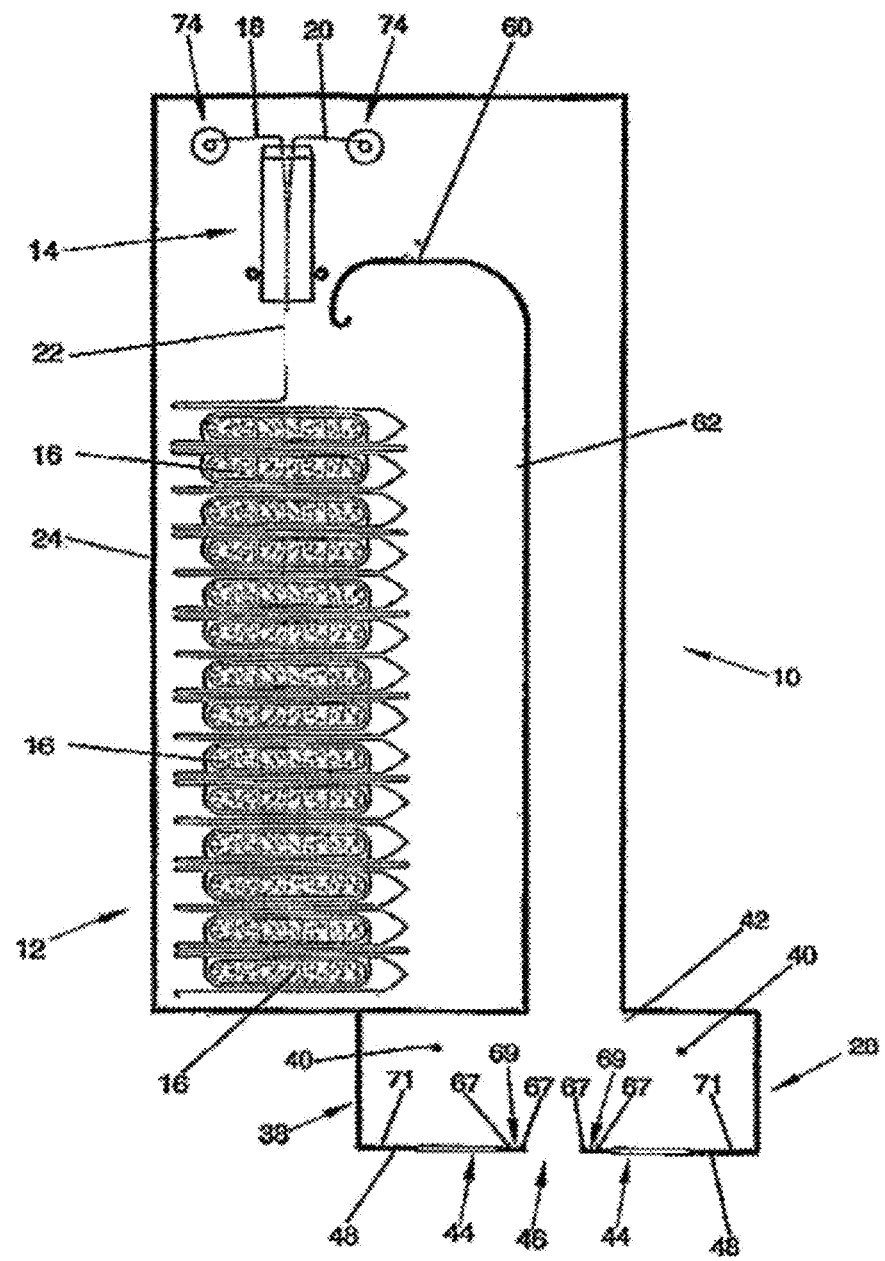
FIG. 3 is a front view of the food handling system with the food dispensing assembly stored within the food storage assembly.
Figure 4:
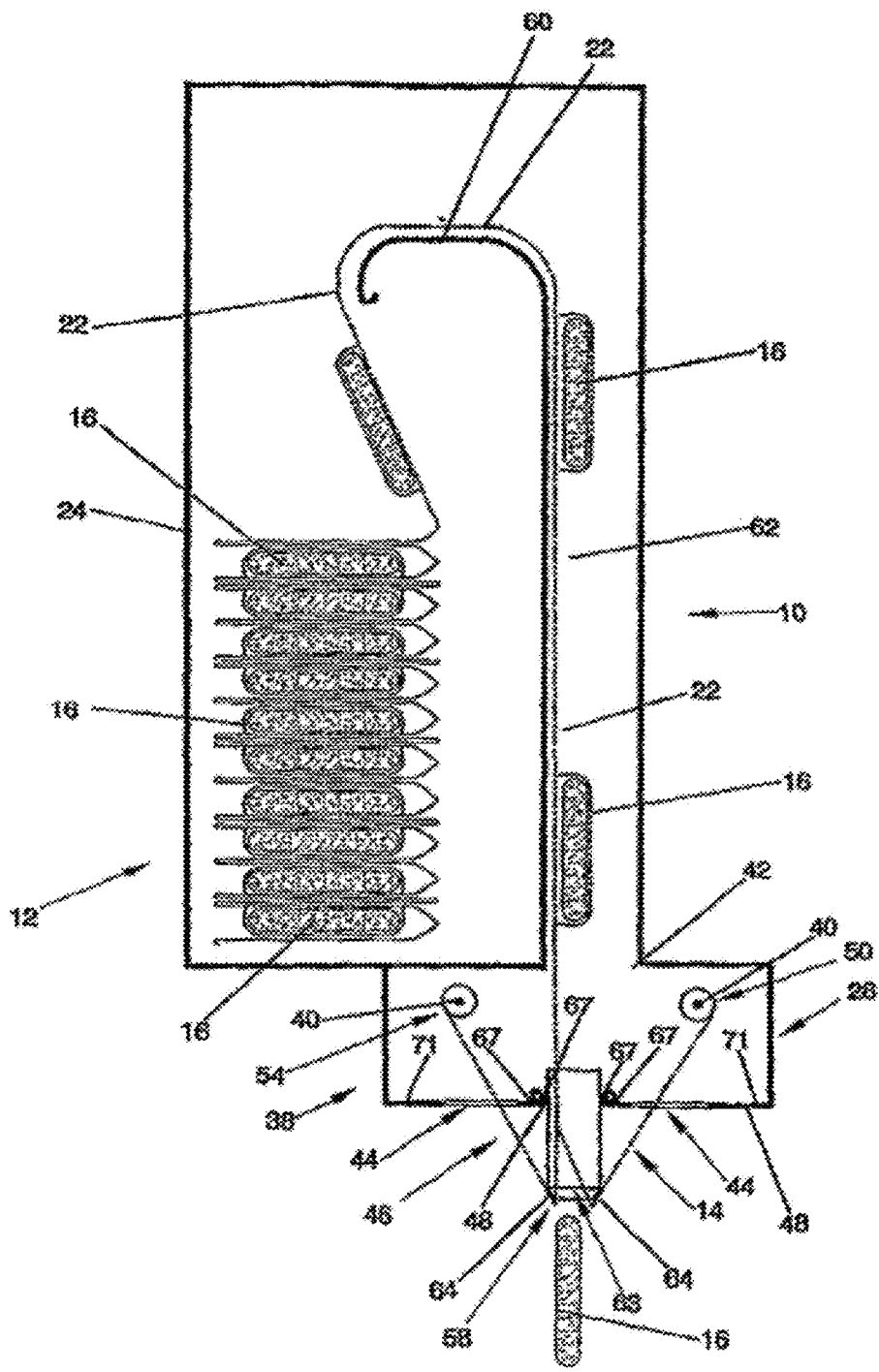
FIG. 4 is a front view of the food handling system with the food dispensing assembly deployed in the dispensing configuration.

As illustrated in FIGS. 3 and 4, a food handling system 10 stores and dispenses food products including a food storage assembly 12 to store the food products therein and a food dispensing assembly 14 to dispense the food products from the food dispensing assembly 14 of the food handling system 10.

Figure 5:
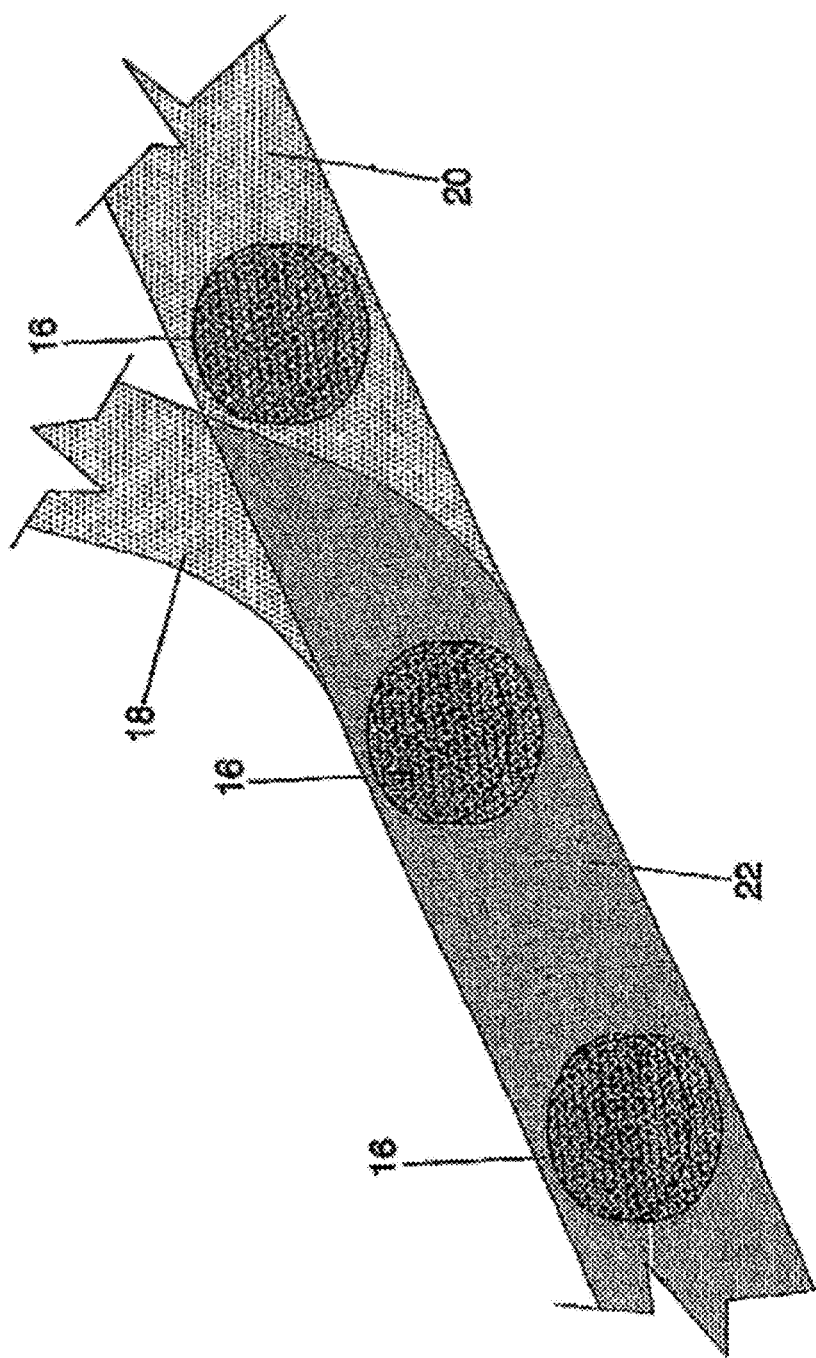
FIG. 5 is a perspective view of a food product hygienically encased within a continuous laminated food strip.

As illustrated in FIG. 5, food products 16, such as hamburger patties, are packaged between a first elongated strip of flexible material or film 18 and a second elongated strip of flexible material or film 20. The first elongated strip of flexible material or film 18 and the second elongated strip of flexible material or film 20 may be sealed together by heat and/or pressure to cooperatively form a continuous laminated food strip 22 to protect the food products 16 there between for storage within the food storage assembly 12 until the first elongated strip of flexible material or film 18 and the second elongated strip of flexible material or film 20 are separated by the food dispensing assembly 14 to dispense the food products 16 from the food handling system 10 as described more fully hereinafter.

As illustrated in FIGS. 3 and 4, the food products 16 are fan folded as a series of food products 16 stacked one upon another in a dispensing configuration or disposition when stored within the food storage assembly 12. As will be evident, the food products 16 are stored and dispensed onto a dish, conveyor, or other surface (not shown) in a hygienic manner without handling or touching by a human operator.

As illustrated in FIGS. 3 and 4, the food storage assembly 12 includes a hollow food product storage enclosure or carton 24 to house and support the plurality of food products 16 sealed or disposed between the first elongated strip of flexible material or film 18 and the second elongated strip of flexible material or film 20 of the continuous laminated food strip 22 stacked in the fan folded configuration.

Figure 6:
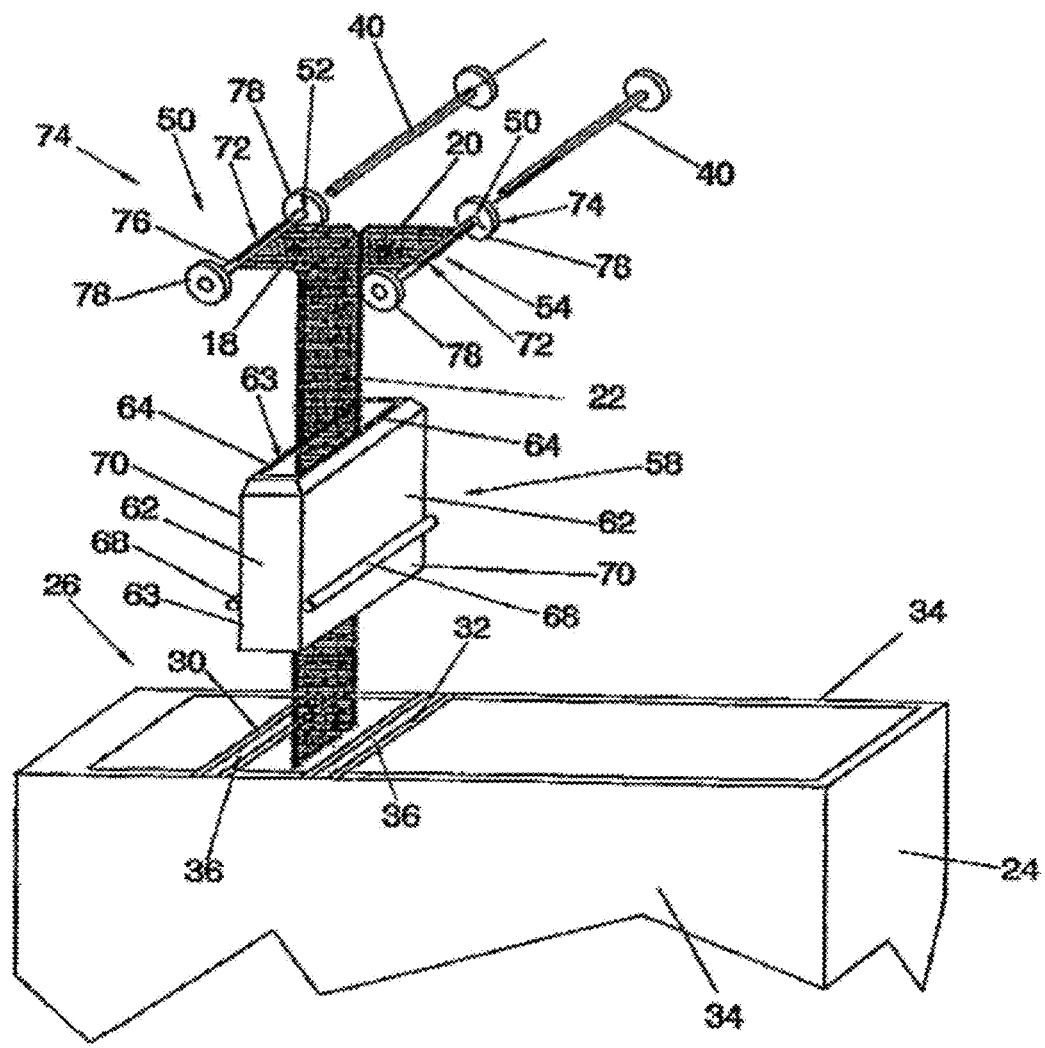
FIG. 6 is a partial exploded view of the upper portion of the food product storage enclosure or carton showing the food dispensing assembly.

As illustrated in FIG. 6, a food dispensing assembly storage support 26 is disposed in the upper portion of the hollow food product storage enclosure or carton 24 of the food storage assembly 12 to support the food dispensing assembly 14 before use.

Figure 7:
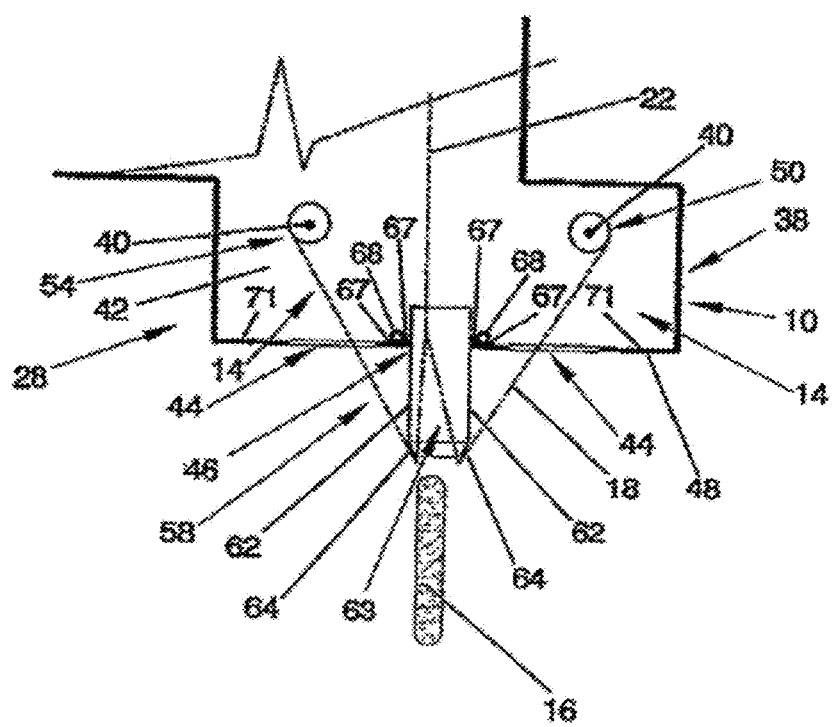
FIG. 7 is a partial detailed schematic front view of the food dispensing assembly deployed in the dispensing configuration.

As illustrated in FIGS. 3 and 4, a food dispensing assembly support 28 is disposed on the lower portion thereof to operatively support the food dispensing assembly 14 when deployed to separate the first elongated strip of flexible material or film 18 and the second elongated strip of flexible material or film 20 to dispense the food products 16 serially and individually from the food dispensing assembly 14 of the food handling system 10, As illustrated in FIGS. 4 and 7.

As illustrated in FIG. 6, the food dispensing assembly storage support 26 comprises a first food dispensing assembly support member 30 and a second food dispensing assembly support member 32 extending between the upper portion of opposite side walls each indicated as 34 of the hollow food product storage enclosure or carton 24. The first food dispensing assembly support member 30 and the second food dispensing assembly support member 32 each includes a groove or channel 36 to receive and support a portion of the food dispensing assembly 14 as described more fully hereinafter.

As illustrated in FIGS. 3, 4, and 7, the food dispensing assembly support 28 includes a food dispensing assembly support housing 38 having a pair of rotatably mounting members or pins each indicated as 40 mounted to a substantially vertically disposed support wall or member 42 and a pair of film separation slots or openings each indicated as 44 and a centrally dispensed laminated strip opening 46 formed through a substantially horizontally disposed lower wall 48 extending outwardly from the substantially vertically disposed support member 42 to receive the first elongated strip of flexible material or film 18 and the second elongated strip of flexible material or film 20, and the continuous laminated food strip 22 respectively when the food dispensing assembly 14 is operatively mounted on the food dispensing assembly support 28 as described more fully hereinafter.

Figure 8:
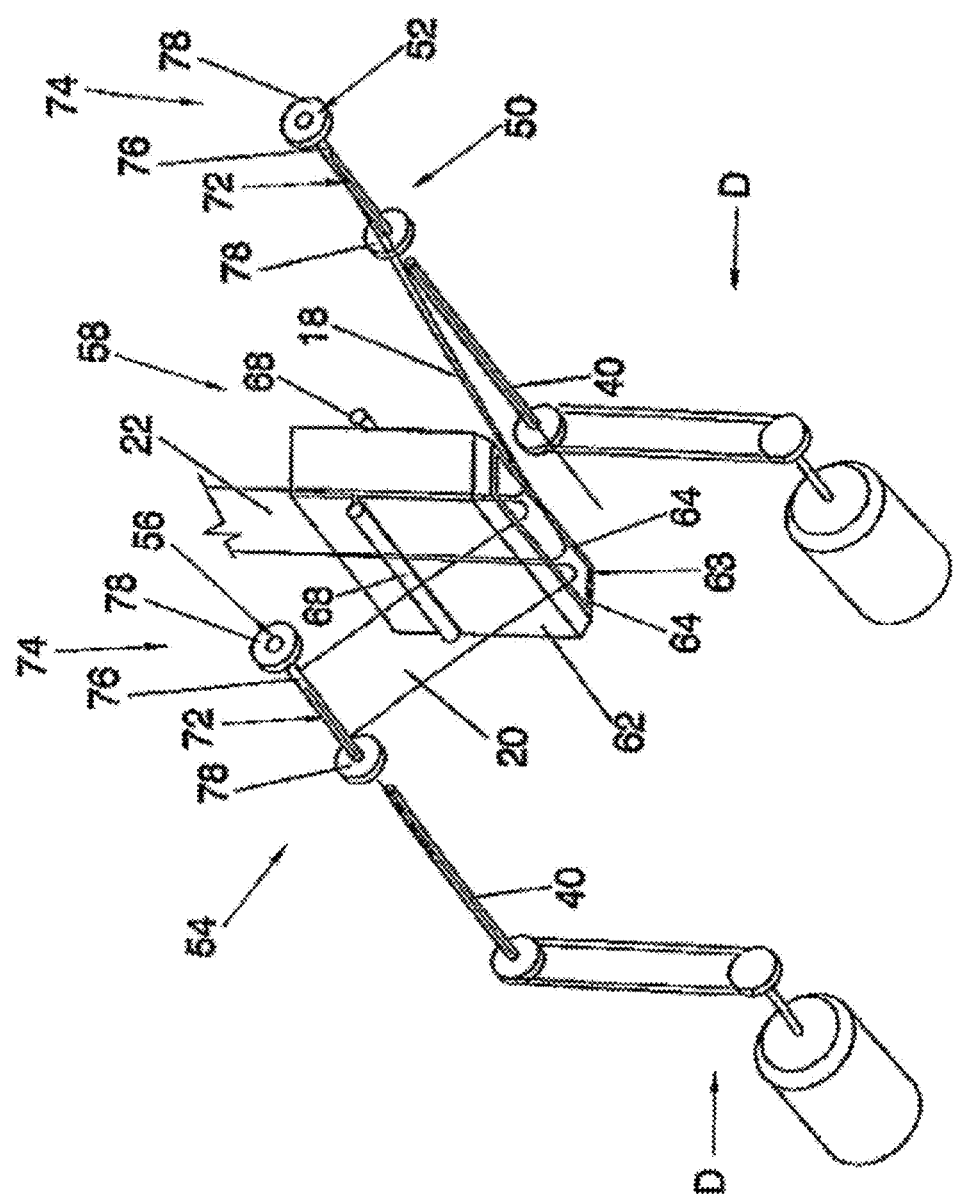
FIG. 8 is a partial perspective view of the food dispensing assembly deployed in the dispensing configuration.

As illustrated in FIGS. 7 and 8, the food dispensing assembly 14 includes a first film strip reel or film take-up device 50 including a centrally disposed pin mounting channel 52 coupled to the leading end portion of the first elongated strip of flexible material or film 18 and a second film strip reel or film take-up device 54 including a centrally disposed pin mounting channel 56 coupled to the leading end portion of the second elongated strip of flexible material or film 20 such that when the first film strip reel or film take-up device 50 and the second film strip reel or film take-up device 54 are mounted on the corresponding rotatable mounting member or pin 40 extending through centrally disposed pin mounting channels 52 and 56, respectively.

The food dispensing assembly 14 further includes a food strip directional control 58 mounted to the substantially horizontally disposed lower wall 48 of the food dispensing assembly support 38 to change the direction of travel of the continuous laminated food strip 22 directed to the food dispensing assembly 14 by a laminated food strip guide comprising an upper arcuate guide member 60 and a substantially vertical guide member 62 disposed within the food storage assembly 12.

The food strip directional control 58 comprises a pair of directional control members each indicated as 62 disposed in spaced relationship to cooperatively form a film slot or channel 63 to receive the continuous laminated food strip 22 and the food products 16 therethrough each directional control member 62 includes a directional control surface 64 to engage the outer surfaces of the first elongated strip of flexible material or film 18 and second elongated strip of flexible material or film 20 when the first film strip reel or film take-up device 50 and the second film strip reel or film take-up device 54 are mounted on the corresponding rotatable mounting member or pin 40.

When so configured, As illustrated in FIG. 8, a drive means D, including a motor and belt or suitable mechanism, rotates the rotatable mounting members or pins 40 rotating the corresponding first film strip reel or film take-up device 50 and the second film strip reel or film take-up device 54 thereby separating the first elongated strip of flexible material or film 18 and the second elongated strip of flexible material or film 20 allowing the food products 16 to drop or fall onto a conveyor, dish, or other surface (not shown).

The preferred angle for redirecting the first elongated strip of flexible material or film 18 and the second elongated strip of flexible material or film 20 is at least 170 degrees. However, it is contemplated that at least either the first elongated strip of flexible material or film 18 and the second elongated strip of flexible material or film 20 is redirected at least about 90 degrees.

Figure 9:
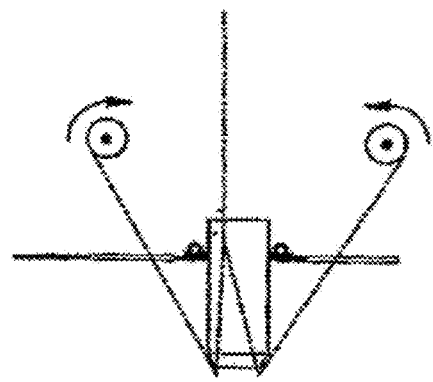
FIGS. 9 through 11 schematically depict different dispositions of the film strip take-up devices relative to the food strip directional control.
Figure 10:
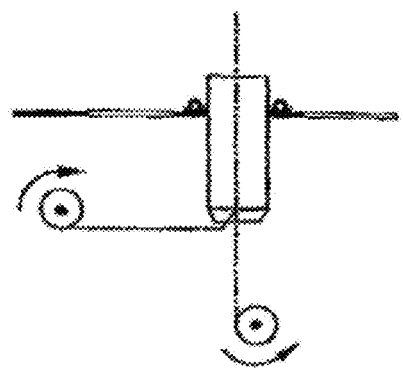
Figure 11:
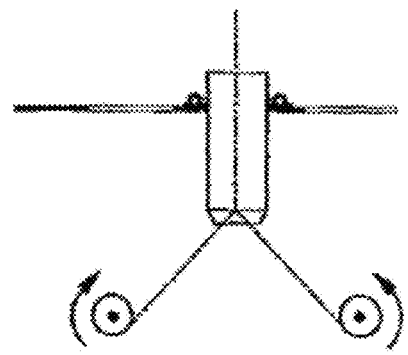

FIGS. 9 through 11 illustrate different examples of redirecting the first elongated strip of flexible material or film 18 and the second elongated strip of flexible material or film 20.

FIG. 9 illustrates both films being redirected to form a redirect angle greater than 90 degrees but less than 360 degrees.

FIG. 10 illustrates only one film being redirected to form a redirect angle of approximately 90 degrees.

FIG. 11 illustrates both films being redirected to form a redirect angle of approximately 90 degrees.

As illustrated in FIGS. 4 and 7, the food strip directional control 58 of the food dispensing assembly 14 are formed on the lower portions of side walls 70 that are partially disposed in the centrally disposed laminated strip opening 46 with an assembly support member 68 attached or formed on opposite side walls 70 to engage the upper surface 71 of the substantially disposed lower wall 48 of the food dispensing assembly support housing 38 on opposite sides of the centrally disposed laminated strip opening 46. Each assembly support member 68 may be disposed between a corresponding pair of retention members each indicated as 67 to cooperatively form an assembly support member receiving channel 69.

Outer end portions of the first elongated strip of flexible material or film 18 and the second elongated strip of flexible material or film 20 are attached or coupled to the first film strip reel or film take-up device 50 and the second film strip reel or film take-up device 54 respectively by an adhesive or through a film slot 72 described hereinafter when deployed.

The first film strip reel or film take-up device 50 and the second film strip reel or film take-up device 54 each comprises a spool 74 including a film strip cross-member 76 to receive the first elongated strip of flexible material or film 18 or the second elongated strip of flexible material or film 20 of the continuous laminated food strip 22 having a film retainer element or member 78 disposed on opposite end portions thereof to retain the first elongated strip of flexible material or film 18 or the second elongated strip of flexible material or film 20 of the continuous laminated food strip 22 thereon during the separation process. Each film strip cross-member 76 may include the film slot 72 to receive the outer portion of the corresponding first elongated strip of flexible material or film 18 or second elongated strip of flexible material or film 20.

When the food handling system 10 is stored or refrigerated, each film strip cross-member 76 is disposed within the corresponding groove or channel 36 of the corresponding food dispensing assembly support member 32.

The continuous laminated food strip 22, disposed in the food storage assembly 12, is placed in the cold storage.

As previously described, the food dispensing assembly 14 may be at least partially stored with the food storage assembly 12, the food dispensing assembly 14 is disposed at the lower portion of the hollow food product storage enclosure or carton 24. The outer-end portions of the laminated food strips 18 and 20 are connected or coupled to the film take-up devices 50 and 54.

When the first elongated strip of flexible material or film 18 and the second elongated strip of flexible material or film 20 of the continuous laminated food strip 22 is reversed backwards at an angle over the first directional control surface 64 and second directional control surface 66 respectively the first elongated strip of flexible material or film 18 and the second elongated strip of flexible material or film 20 of the continuous laminated food strip 22 are separated allowing the food products 16 to separate from the film of the continuous laminated food strip 22.

This results in unpackaging of the food products 16 from the laminated food strip 22. As this delamination takes place, the delamination food product 16 passes onto the conveyor belt or other receiving surface (not shown).

Thus, delaminated/unpackaged food products 16 under aseptic conditions may be fed to a grill or conveyor oven or any other heat source directly for the purpose of cooking, without the food being even touched by the cooking staff.

Figure 12:
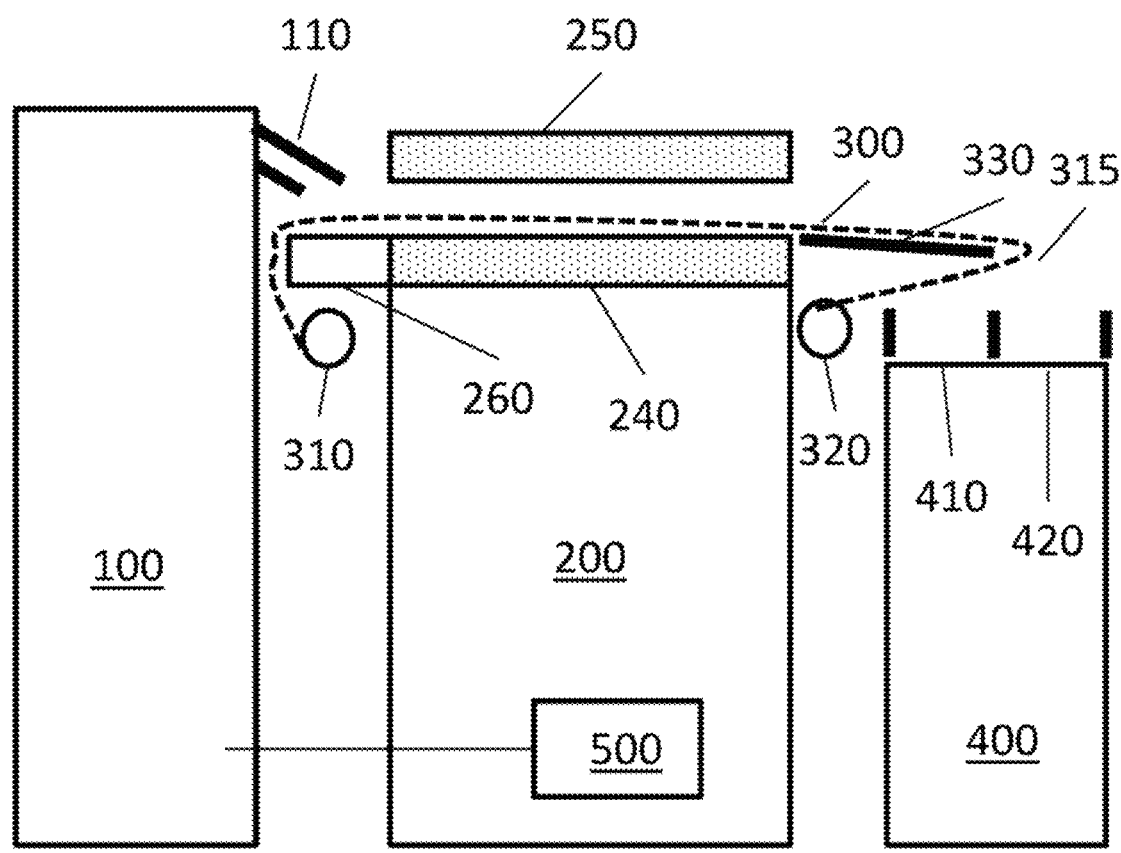
FIG. 12 illustrates an automated grill system diverting a cooked product to a first receiving area.

An automated grill system, as illustrated in FIG. 12, includes a food product dispensing system 100 for dispensing uncooked food product; a dual-sided grill system 200 for cooking the uncooked food product; a staging system 400 for receiving cooked food product; and a non-continuous indexed conveyor belt 300 for conveying the uncooked food product from the food product dispensing system 100 to the dual-sided grill system 200 and for conveying the cooked food product from the dual-sided grill system 200 to the staging system 400. The dual-sided grill system is a clam shell grill system including a lower cooking platen 240 and an upper cooking platen 250.

The dual-sided grill system may include independently temperature controlled cooking areas.

As illustrated in FIG. 12, non-continuous indexed conveyor belt 300 transverses between the lower cooking platen 240 and the upper cooking platen 250. The upper platen 250 of the dual-sided grill system is in an open position when not cooking food product such that the upper platen 250 does not engage food product and does not engage the non-continuous indexed conveyor belt 300.

The staging system 400 has multiple staging areas (410 and 420), each staging area (410 and 420) receives cooked food product. It is noted that the staging areas can receive diverse or different cooked food product.

Figure 13:
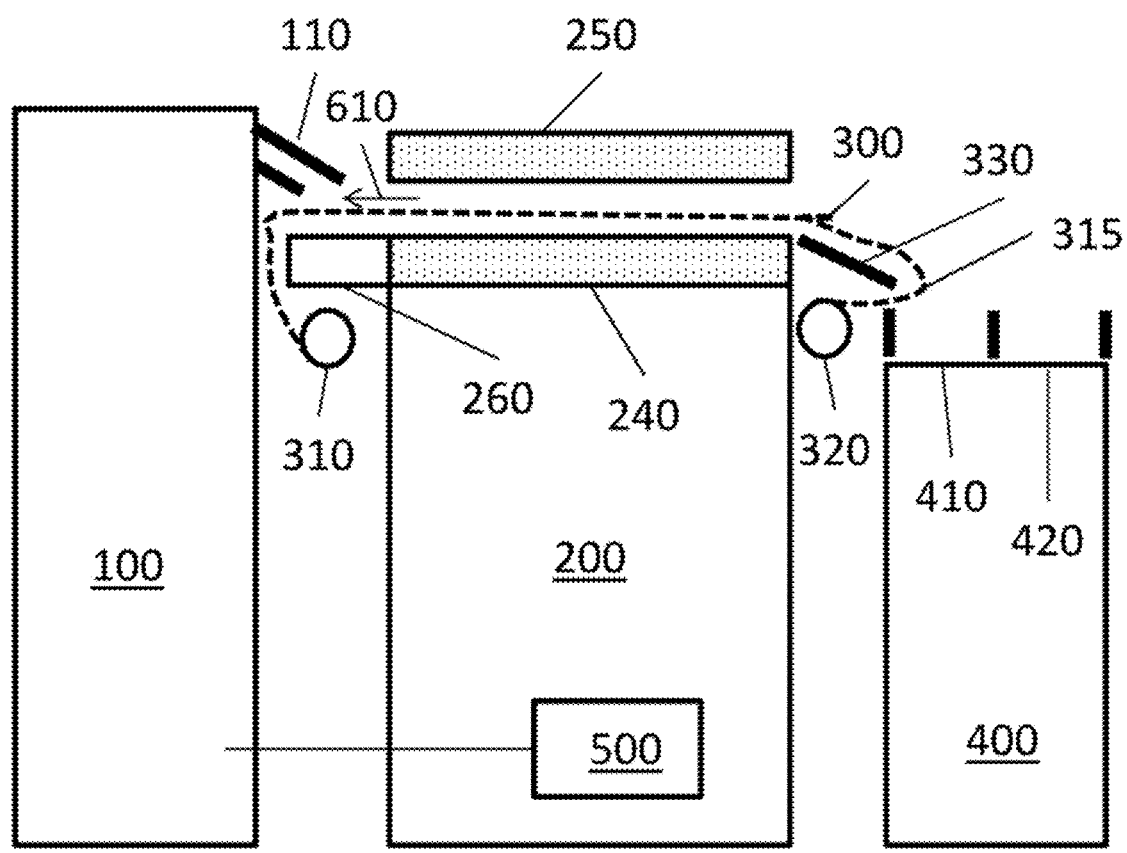
FIG. 13 illustrates an automated grill system diverting a cooked product to a second receiving area.
Figure 15:
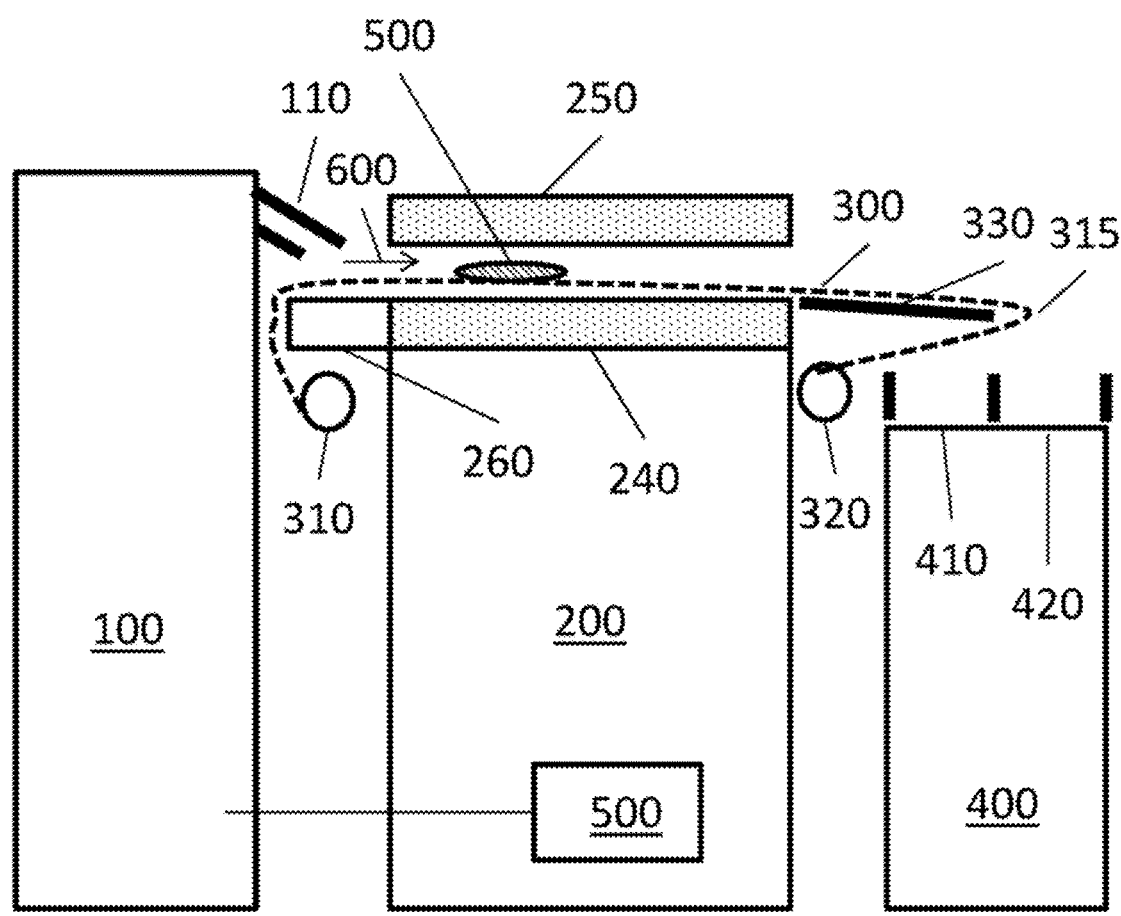
FIG. 15 illustrates an automated grill system cooking the uncooked product of FIG. 14.
Figure 16:
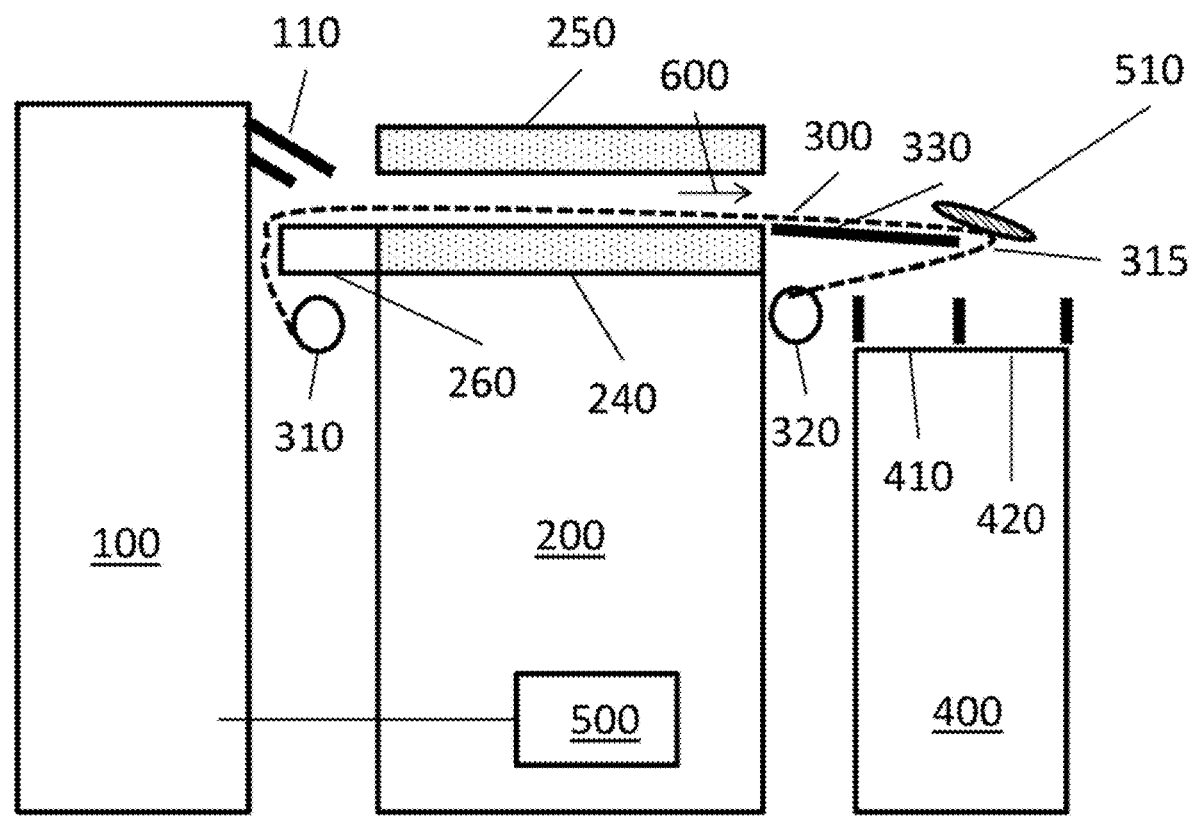
FIG. 16 illustrates an automated grill system diverting the cooked product of FIG. 15 to the first receiving area.

The non-continuous indexed conveyor belt 300 moves in a first direction 600, as illustrated in FIG. 15, when the non-continuous indexed conveyor belt 300 conveys the uncooked food product 500 from the food product dispensing system 100 to the dual-sided grill system 200 and conveys, as illustrated in FIG. 16, the cooked food product 500 from the dual-sided grill system 200 to the staging system 400. The non-continuous indexed conveyor belt 300 moves in a second direction 610 (as illustrated in FIG. 13) when the non-continuous indexed conveyor belt is being reset. The first direction 600 and the second direction 610 are different directions.

The non-continuous indexed conveyor belt 300 includes a first driver 320 for moving the non-continuous indexed conveyor belt 300 in the first direction 600 and a second driver 310 for moving the non-continuous indexed conveyor belt 300 in a second direction 610.

The automated grill system includes a controller 500 for controlling the movement of the non-continuous indexed conveyor belt 300. The controller 500 causes the non-continuous indexed conveyor belt 300 to move a first distance when the food product dispensing system 100 dispenses uncooked food product onto the non-continuous indexed conveyor belt 300.

The controller 500 controls the non-continuous indexed conveyor belt 300 to move a second distance when the non-continuous indexed conveyor belt 300 conveys the uncooked food product from the food product dispensing system to the dual-sided grill system.

The controller 500 controls the non-continuous indexed conveyor belt 300 to move a third distance when the non-continuous indexed conveyor belt 300 conveys the cooked food product from the dual-sided grill system 200 to the staging system 400.

The controller 500 controls non-continuous indexed conveyor belt 300 to move a fourth distance when the non-continuous indexed conveyor belt 300 is being reset.

The non-continuous indexed conveyor belt 300 may include cooking areas and non-cooking areas.

The automated grill system may include a non-continuous indexed conveyor belt cleaning system (not shown) for cleaning residual food product and cooking by-product from the non-continuous indexed conveyor belt.

Alternatively, the conveyer belt may be a continuous indexed conveyor belt for conveying the uncooked food product from the food product dispensing system to the dual-sided grill system and for conveying the cooked food product from the dual-sided grill system to the staging system.

As illustrated in FIG. 12, the automated grill system includes a receiving area 260, located between the food product dispensing system 100 and the dual-sided grill system 200, for receiving the dispensed uncooked food product. The conveyor belt 300 conveys the uncooked food product from the receiving area 260 to the dual-sided grill system 200.

The receiving area 260 allows the uncooked food product to be properly staged prior to cooking without having the uncooked food product from being dispensed directly from the food product dispensing system 100 onto the dual-sided grill system 200.

As illustrated in FIG. 12, the automated grill system includes a diverting system 330 for moving an output edge 315 of the conveyor belt 300 between a first position, as illustrated in FIG. 12, and a second position, as illustrated in FIG. 13. The first position, as illustrated in FIG. 12, corresponds to the first staging area 420 to allow the first staging area 420 to receive cooked food product. The second position, as illustrated in FIG. 13, corresponds to the second staging area 410 to allow the second staging area 410 to receive cooked food product.

Figure 14:
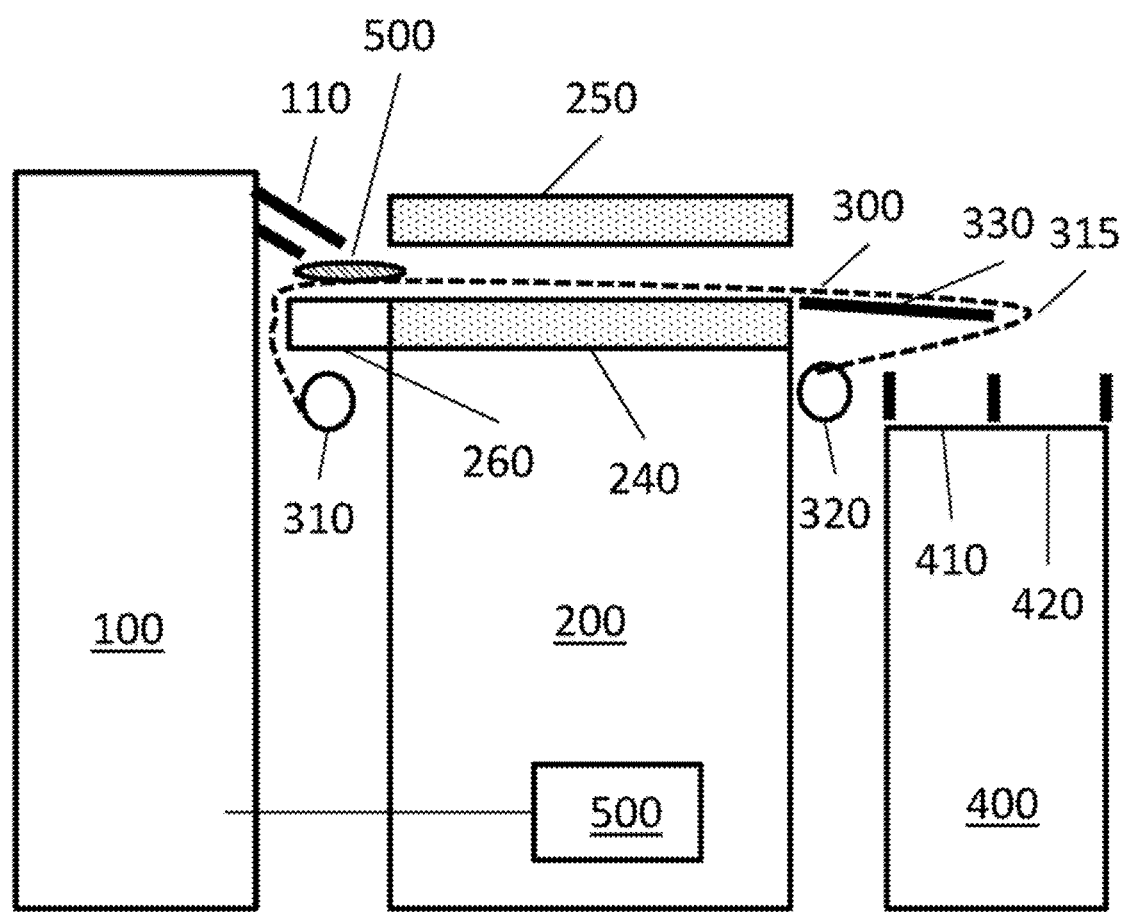
FIG. 14 illustrates an automated grill system receiving uncooked product from a food product delaminator.

FIG. 14 illustrates the dispensing of uncooked food product 500 from the food product dispensing system 100 onto the receiving area 260.

FIG. 15 illustrates the conveying of the uncooked food product 500 from the receiving area 260 to the dual-sided grill system 200.

FIG. 16 illustrates the conveying of cooked food product 510 from the dual-sided grill system 200 to the first staging area 420 of the staging system 400.

It is noted that although the above embodiments discuss a lever or flapper diverter mechanism that moves the output edge of the conveyor belt to enable the depositing the cooked food at different staging, the diverting mechanism may comprise a mechanism that moves the entire conveyor belt bi-directionality, in a horizontal direction, so that the output edge of the conveyor belt is positioned over the appropriate staging area. In this embodiment, the conveyor belt is part of a single unit that can move bi-directionally, in a horizontal direction, between the receiving area and the staging areas.

It is further noted that although the above embodiments discuss a lever or flapper diverter mechanism that moves the output edge of the conveyor belt to enable the depositing the cooked food at different staging, the diverting mechanism may comprise a mechanism that moves the first driver bi-directionally, in a horizontal direction, so that the output edge of the conveyor belt is positioned over the appropriate staging area. In this embodiment, the first driver moves bi-directionally, in a horizontal direction, so that the output edge of the conveyor belt is positioned over the appropriate staging area.

It is additionally noted that although the above embodiments discuss a lever or flapper diverter mechanism that moves the output edge of the conveyor belt to enable the depositing the cooked food at different staging, the diverting mechanism may comprise a mechanism that comprises 2 or more belts, which can be moved bi-directionally, in a horizontal direction, so that the output edge of the conveyor belt is positioned over the appropriate staging area. In this embodiment, the conveyor belts are part of a single unit that can move bi-directionally, in a horizontal direction, between the receiving area and the staging areas.

An automated grill system comprises a food product dispensing system for dispensing uncooked food product; a dual-sided grill system for cooking the uncooked food product; a staging system for receiving cooked food product; and a non-continuous indexed conveyor belt for conveying the uncooked food product from the food product dispensing system to the dual-sided grill system and for conveying the cooked food product from the dual-sided grill system to the staging system.

The dual-sided grill system may be a clam shell grill system including a lower cooking platen and an upper cooking platen.

The dual-sided grill system may include independently temperature controlled cooking areas.

The non-continuous indexed conveyor belt may transverse between the lower cooking platen and the upper cooking platen.

The upper platen of the dual-sided grill system may be in an open position when not cooking food product such that the upper platen does not engage food product and does not engage the non-continuous indexed conveyor belt.

The staging system may have multiple staging areas, each staging area to receive a diverse cooked food product.

The non-continuous indexed conveyor belt may move in a first direction when the non-continuous indexed conveyor belt conveys the uncooked food product from the food product dispensing system to the dual-sided grill system and conveys the cooked food product from the dual-sided grill system to the staging system; the non-continuous indexed conveyor belt moves in a second direction when the non-continuous indexed conveyor belt is being reset; the first direction and the second direction being different directions.

The non-continuous indexed conveyor belt may include a first driver for moving the non-continuous indexed conveyor belt in a first direction and a second driver for moving the non-continuous indexed conveyor belt in a second direction; the first direction and the second direction being different directions.

The automated grill system may further include a controller; the controller controlling the non-continuous indexed conveyor belt to move a first distance when the food product dispensing system dispenses uncooked food product onto the non-continuous indexed conveyor belt; the controller controlling the non-continuous indexed conveyor belt to move a second distance when the non-continuous indexed conveyor belt conveys the uncooked food product from the food product dispensing system to the dual-sided grill system; the controller controlling the non-continuous indexed conveyor belt to move a third distance when the non-continuous indexed conveyor belt conveys the cooked food product from the dual-sided grill system to the staging system; the controller controlling non-continuous indexed conveyor belt to move a fourth distance when the non-continuous indexed conveyor belt is being reset.

The non-continuous indexed conveyor belt may include cooking areas and non-cooking areas.

The automated grill system may further include a non-continuous indexed conveyor belt cleaning system for cleaning residual food product and cooking by-product from the non-continuous indexed conveyor belt.

The food dispensing system may include a laminated food strip including a pair of flexible film strips to store a plurality of food products therebetween to dispense the food products therefrom, the food dispensing assembly comprises a pair of rotatable film strip take-up devices corresponding to the pair of flexible film strips, each the rotatable film strip take-up device coupled to the leading end portion of the corresponding flexible film strip such that when each the rotatable film take-up device is rotated the distal portions of the flexible film strips are separated from each other releasing the food product having been disposed therebetween.

An automated grill system comprises a food product dispensing system for dispensing uncooked food product; a dual-sided grill system for cooking the uncooked food product; a staging system for receiving cooked food product; and a continuous indexed conveyor belt for conveying the uncooked food product from the food product dispensing system to the dual-sided grill system and for conveying the cooked food product from the dual-sided grill system to the staging system.

The dual-sided grill system may be a clam shell grill system including a lower cooking platen and an upper cooking platen.

The dual-sided grill system may include independently temperature controlled cooking areas.

The continuous indexed conveyor belt may transverse between the lower cooking platen and the upper cooking platen.

The aid upper platen of the dual-sided grill system may be in an open position when not cooking food product such that the upper platen does not engage food product and does not engage the continuous indexed conveyor belt.

The staging system may have multiple staging areas, each staging area to receive a diverse cooked food product.

The continuous indexed conveyor belt may move in a first direction when the continuous indexed conveyor belt conveys the uncooked food product from the food product dispensing system to the dual-sided grill system and conveys the cooked food product from the dual-sided grill system to the staging system.

The automated grill system may further include a controller; the controller controlling the continuous indexed conveyor belt to move a first distance when the food product dispensing system dispenses uncooked food product onto the continuous indexed conveyor belt; the controller controlling the continuous indexed conveyor belt to move a second distance when the continuous indexed conveyor belt conveys the uncooked food product from the food product dispensing system to the dual-sided grill system; the controller controlling the continuous indexed conveyor belt to move a third distance when the continuous indexed conveyor belt conveys the cooked food product from the dual-sided grill system to the staging system.

The automated grill system may further include a continuous indexed conveyor belt cleaning system for cleaning residual food product and cooking by-product from the continuous indexed conveyor belt.

The food dispensing system may include a laminated food strip including a pair of flexible film strips to store a plurality of food products therebetween to dispense the food products therefrom, the food dispensing assembly comprises a pair of rotatable film strip take-up devices corresponding to the pair of flexible film strips, each the rotatable film strip take-up device coupled to the leading end portion of the corresponding flexible film strip such that when each the rotatable film take-up device is rotated the distal portions of the flexible film strips are separated from each other releasing the food product having been disposed therebetween.

An automated grill system comprises a food product dispensing system for dispensing uncooked food product; a dual-sided grill system for cooking the uncooked food product; a receiving area, located between the food product dispensing system and the dual-sided grill system, for receiving the dispensed uncooked food product; a staging system for receiving cooked food product; and a conveyor belt for conveying the uncooked food product from the receiving area to the dual-sided grill system and for conveying the cooked food product from the dual-sided grill system to the staging system.

The dual-sided grill system may be a clam shell grill system including a lower cooking platen and an upper cooking platen.

The dual-sided grill system may include independently temperature controlled cooking areas.

The conveyor belt may transverse between the lower cooking platen and the upper cooking platen.

The upper platen of the dual-sided grill system may be in an open position when not cooking food product such that the upper platen does not engage food product and does not engage the conveyor belt.

The staging system may have multiple staging areas, each staging area to receive a diverse cooked food product.

The automated grill system may further includes a controller; the controller controlling the conveyor belt to move a first distance when the food product dispensing system dispenses uncooked food product onto the conveyor belt; the controller controlling the conveyor belt to move a second distance when the conveyor belt conveys the uncooked food product from the receiving area to the dual-sided grill system; the controller controlling the conveyor belt to move a third distance when the conveyor belt conveys the cooked food product from the dual-sided grill system to the staging system.

The automated grill system may further include a conveyor belt cleaning system for cleaning residual food product and cooking by-product from the conveyor belt.

The food dispensing system may include a laminated food strip including a pair of flexible film strips to store a plurality of food products therebetween to dispense the food products therefrom, the food dispensing assembly comprises a pair of rotatable film strip take-up devices corresponding to the pair of flexible film strips, each the rotatable film strip take-up device coupled to the leading end portion of the corresponding flexible film strip such that when each the rotatable film take-up device is rotated the distal portions of the flexible film strips are separated from each other releasing the food product having been disposed therebetween.

An automated grill system comprises a food product dispensing system for dispensing uncooked food product; a dual-sided grill system for cooking the uncooked food product; a staging system for receiving cooked food product; the staging system having a first staging area and a second staging area, the first staging area and the second staging area staging area receiving cooked food product; a conveyor belt for conveying the uncooked food product from the food product dispensing system to the dual-sided grill system and for conveying the cooked food product from the dual-sided grill system to the staging system; and a diverting system for moving an output edge of the conveyor belt between a first position and a second position, the first position corresponding to the first staging area to allow the first staging area to receive cooked food product, the second position corresponding to the second staging area to allow the second staging area to receive cooked food product.

The dual-sided grill system may be a clam shell grill system including a lower cooking platen and an upper cooking platen.

The dual-sided grill system may include independently temperature controlled cooking areas.

The conveyor belt may transverse between the lower cooking platen and the upper cooking platen.

The upper platen of the dual-sided grill system may be in an open position when not cooking food product such that the upper platen does not engage food product and does not engage the conveyor belt.

The automated grill system may further include a controller; the controller controlling the conveyor belt to move a first distance when the food product dispensing system dispenses uncooked food product onto the conveyor belt; the controller controlling the conveyor belt to move a second distance when the conveyor belt conveys the uncooked food product from the food product dispensing system to the dual-sided grill system; the controller controlling the conveyor belt to move a third distance when the conveyor belt conveys the cooked food product from the dual-sided grill system to the staging system.

The automated grill system may further include a conveyor belt cleaning system for cleaning residual food product and cooking by-product from the conveyor belt.

The food dispensing system may include a laminated food strip including a pair of flexible film strips to store a plurality of food products therebetween to dispense the food products therefrom, the food dispensing assembly comprises a pair of rotatable film strip take-up devices corresponding to the pair of flexible film strips, each the rotatable film strip take-up device coupled to the leading end portion of the corresponding flexible film strip such that when each the rotatable film take-up device is rotated the distal portions of the flexible film strips are separated from each other releasing the food product having been disposed therebetween.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. An automated grill system comprising:
    a food product dispensing system for dispensing uncooked food product;
    a dual-sided grill system for cooking the uncooked food product;
    a first staging area for receiving a first cooked food product;
    a second staging area for receiving a second cooked food product;
    a non-continuous indexed conveyor belt for conveying the uncooked food product from said food product dispensing system to said dual-sided grill system and for conveying the cooked food product from said dual-sided grill system to said first staging area and said second staging area; and
    a diverter, operatively connected to said non-continuous indexed conveyor belt, for moving an output edge of said non-continuous indexed conveyor belt between a first position and a second positon, said first position corresponding to said first staging area to enable said first staging area to receive the first cooked food product, said second position corresponding to said second staging area to enable said second staging area to receive the second cooked food product.

2. The automated grill system as claimed in claim 1, wherein said dual-sided grill system is a clam shell grill system including a lower cooking platen and an upper cooking platen.

3. The automated grill system as claimed in claim 1, wherein said dual-sided grill system includes independently temperature controlled cooking areas.

4. The automated grill system as claimed in claim 2, wherein said non-continuous indexed conveyor belt transverses between said lower cooking platen and said upper cooking platen.

5. The automated grill system as claimed in claim 4, wherein said upper platen of said dual-sided grill system is in an open positon when not cooking food product such that said upper platen does not engage food product and does not engage said non-continuous indexed conveyor belt.

6. The automated grill system as claimed in claim 1, wherein said non-continuous indexed conveyor belt moves in a first direction when said non-continuous indexed conveyor belt conveys the uncooked food product from said food product dispensing system to said dual-sided grill system and conveys the cooked food product from said dual-sided grill system to said first staging area and said second staging area;
    said non-continuous indexed conveyor belt moves in a second direction when said non-continuous indexed conveyor belt is being reset;
    said first direction and said second direction being different directions.

7. The automated grill system as claimed in claim 1, wherein said non-continuous indexed conveyor belt includes a first driver for moving said non-continuous indexed conveyor belt in a first direction and a second driver for moving said non-continuous indexed conveyor belt in a second direction;
    said first direction and said second direction being different directions.

8. The automated grill system as claimed in claim 1, further comprising a controller;
    said controller controlling said non-continuous indexed conveyor belt to move a first distance when said food product dispensing system dispenses uncooked food product onto said non-continuous indexed conveyor belt;
    said controller controlling said non-continuous indexed conveyor belt to move a second distance when said non-continuous indexed conveyor belt conveys the uncooked food product from said food product dispensing system to said dual-sided grill system;
    said controller controlling said non-continuous indexed conveyor belt to move a third distance when said non-continuous indexed conveyor belt conveys the cooked food product from said dual-sided grill system to said first staging area and said second staging area;
    said controller controlling non-continuous indexed conveyor belt to move a fourth distance when said non-continuous indexed conveyor belt is being reset.

9. The automated grill system as claimed in claim 1, wherein said non-continuous indexed conveyor belt includes cooking areas and non-cooking areas.

10. The automated grill system as claimed in claim 1, wherein said food dispensing system includes a laminated food strip including a pair of flexible film strips to store a plurality of food products therebetween to dispense the food products therefrom, said food dispensing assembly comprises a pair of rotatable film strip take-up devices corresponding to the pair of flexible film strips, each said rotatable film strip take-up device coupled to the leading end portion of the corresponding flexible film strip such that when each said rotatable film take-up device is rotated the distal portions of the flexible film strips are separated from each other releasing the food product having been disposed therebetween.

11. An automated grill system comprising:
- a food product dispensing system for dispensing uncooked food product;
- a dual-sided grill system for cooking the uncooked food product;
- a first staging area for receiving a first cooked food product;
- a second staging area for receiving a second cooked food product;
- a continuous indexed conveyor belt for conveying the uncooked food product from said food product dispensing system to said dual-sided grill system and for conveying the cooked food product from said dual-sided grill system to said first staging area and said second staging area; and
- a diverter, operatively connected to said continuous indexed conveyor belt, for moving an output edge of said continuous indexed conveyor belt between a first position and a second positon, said first position corresponding to said first staging area to enable said first staging area to receive the first cooked food product, said second position corresponding to said second staging area to enable said second staging area to receive the second cooked food product.

12. The automated grill system as claimed in claim 11, wherein said dual-sided grill system is a clam shell grill system including a lower cooking platen and an upper cooking platen.

13. The automated grill system as claimed in claim 12, wherein said continuous indexed conveyor belt transverses between said lower cooking platen and said upper cooking platen.

14. The automated grill system as claimed in claim 12, wherein said upper platen of said dual-sided grill system is in an open positon when not cooking food product such that said upper platen does not engage food product and does not engage said continuous indexed conveyor belt.

15. The automated grill system as claimed in claim 11, wherein said continuous indexed conveyor belt moves in a first direction when said continuous indexed conveyor belt conveys the uncooked food product from said food product dispensing system to said dual-sided grill system and conveys the cooked food product from said dual-sided grill system to said staging system.

16. The automated grill system as claimed in claim 11, further comprising a controller;
- said controller controlling said continuous indexed conveyor belt to move a first distance when said food product dispensing system dispenses uncooked food product onto said continuous indexed conveyor belt;
- said controller controlling said continuous indexed conveyor belt to move a second distance when said continuous indexed conveyor belt conveys the uncooked food product from said food product dispensing system to said dual-sided grill system;
- said controller controlling said continuous indexed conveyor belt to move a third distance when said continuous indexed conveyor belt conveys the cooked food product from said dual-sided grill system to said first staging area and said second staging area.

* * * * *